United States Patent
Dutta et al.

(10) Patent No.: US 12,115,597 B2
(45) Date of Patent: Oct. 15, 2024

(54) POWDER MATERIAL MASS FLOW RATE MEASURING APPARATUS FOR ADDITIVE MANUFACTURING

(71) Applicant: DM3D Technology, LLC, Auburn Hills, MI (US)

(72) Inventors: Bhaskar Dutta, Troy, MI (US); Vijayavel Bagavath-Singh, Troy, MI (US); Mark David Lewan, White Lake, MI (US)

(73) Assignee: DM3D Technology, LLC, Auburn Hills, MI (US)

( * ) Notice: Subject to any disclaimer, the term of this patent is extended or adjusted under 35 U.S.C. 154(b) by 370 days.

(21) Appl. No.: 16/768,115

(22) PCT Filed: Nov. 29, 2018

(86) PCT No.: PCT/US2018/062942
§ 371 (c)(1),
(2) Date: May 29, 2020

(87) PCT Pub. No.: WO2019/108719
PCT Pub. Date: Jun. 6, 2019

(65) Prior Publication Data
US 2020/0306886 A1    Oct. 1, 2020

Related U.S. Application Data

(60) Provisional application No. 62/592,053, filed on Nov. 29, 2017.

(51) Int. Cl.
*B23K 26/342*    (2014.01)
*B23K 26/082*    (2014.01)
(Continued)

(52) U.S. Cl.
CPC .......... *B23K 26/342* (2015.10); *B23K 26/082* (2015.10); *B23K 26/1464* (2013.01);
(Continued)

(58) Field of Classification Search
CPC .. B23K 26/342; B23K 26/082; B23K 26/702; B23K 26/32; B23K 26/34; B23K 26/127;
(Continued)

(56) References Cited

U.S. PATENT DOCUMENTS 6,046,426 A    4/2000  Jeantette et al.
6,715,640 B2   4/2004  Tapphorn et al.
(Continued)

FOREIGN PATENT DOCUMENTS

EP    0239703 A1 * 12/1986

OTHER PUBLICATIONS

International Search Report and Written Opinion in PCT/US18/62942, dated Jan. 31, 2019.

*Primary Examiner* — Janie M Loeppke
*Assistant Examiner* — Abigail H Rhue
(74) *Attorney, Agent, or Firm* — WARNER NORCROSS + JUDD LLP

(57) ABSTRACT

An assembly for measuring metal powder material mass flow rate during direct metal deposition. A detection strip is placed in the gas-blown metal powder material flow path. The detection strip is fixed in one end and suspended at the other end. The flowing metal powder material particles induce displacement to the detection strip. A displacement measurement sensor measures the amount of displacement of the detection strip. The amount of displacement of the detection strip gives relationship to the amount of the metal powder material flowing in the metal powder material flow path. The detection strip and the sensor are connected to a housing with a metal powder material inlet port and metal (Continued)

powder material outlet port and includes internal features for smooth travel of metal powder material particles.

11 Claims, 4 Drawing Sheets

(51) Int. Cl.
*B23K 26/14* (2014.01)
*G01F 1/30* (2006.01)
*G01F 1/78* (2006.01)
*B23K 26/70* (2014.01)
*B33Y 10/00* (2015.01)
*B33Y 30/00* (2015.01)
*B33Y 50/02* (2015.01)
*B33Y 70/00* (2020.01)

(52) U.S. Cl.
CPC .............. *G01F 1/30* (2013.01); *G01F 1/78* (2013.01); *B23K 26/702* (2015.10); *B33Y 10/00* (2014.12); *B33Y 30/00* (2014.12); *B33Y 50/02* (2014.12); *B33Y 70/00* (2014.12)

(58) Field of Classification Search
CPC .. B23K 26/042; B23K 26/0604; B23K 26/03; B23K 26/70; B23K 15/0093; B23K 15/0086; B23K 26/0643; B23K 26/0006; B23K 26/354; B23K 26/1224; B23K 26/22; B23K 26/346; B23K 15/02; B23K 26/0853; B23K 15/0026; B23K 26/16; B23K 10/027; B23K 26/123; B23K 15/002; B23K 10/006; B23K 37/0461; B23K 26/032; B23K 9/044; B23K 26/034; G01F 1/30; G01F 1/78; G01F 1/66; G01F 1/661; G01F 1/666; G01F 1/64; G01F 7/00; G01F 1/28; G01F 1/383; G01F 1/74; G01F 13/005; G01F 25/14; G01F 1/76; G01F 1/86; B33Y 10/00; B33Y 30/00; B33Y 50/02; B33Y 70/00; B33Y 50/00; B33Y 40/00; B33Y 80/00; B29C 64/386; B29C 64/153; B29C 45/7312; B29C 33/3842; B29C 33/02; B29C 41/20; B29C 64/40; B29C 41/52; B29C 41/36; B29C 64/336; B29C 64/329; B29C 64/214; B29C 64/393; B29C 64/343; B29C 64/205; B29C 64/218; B29C 64/25; B29C 64/307; B29C 64/135; B29C 64/371; B29C 64/364; B29C 64/255; B29C 64/176; B29C 64/188; B29C 64/35; B29C 64/245; B29C 64/321; B29C 64/357; B29C 31/085; B29C 64/165; B29C 64/264; B29C 64/171; B29C 64/268; B29C 64/194; B29C 64/209; B22F 10/00; B22F 10/20; B22F 1/065; B22F 1/054; B22F 9/082; B22F 1/05; B22F 1/052; B22F 1/0003; B22F 12/41; B22F 10/28; B22F 12/70; B22F 10/322; B22F 12/30; B22F 12/00; B22F 10/85; B22F 10/30; B22F 10/70; B22F 10/80; B22F 12/90; B22F 12/45; B22F 3/105; B22F 3/24; B22F 10/40; B22F 3/003; B22F 3/004; B22F 9/04; B22F 12/60; B22F 10/31; B22F 10/25; B22F 12/53; B22F 10/34; B22F 1/14; B22F 9/12; B22F 1/102; B22F 10/38; B22F 1/145; B22F 10/73; B22F 3/18; G05B 19/41875; C23C 16/52; C23C 24/04; C23C 24/106; G01N 27/128; G01N 21/71; G01N 21/00; G01N 9/24; F28F 7/02; B01F 35/7141; B01F 33/406; B22D 11/22; B22D 11/0611; C22C 28/00; C22C 38/00; C22C 38/002; C22C 38/005; C22C 38/16; C22C 38/10; C22C 1/056; C22C 1/0416; C22C 38/44; C22C 38/02; C22C 38/58; C22C 14/00; C22C 19/00; C22C 21/00; C22C 1/0433; C22C 1/0458; H01F 1/0555; H01F 1/0577; H01F 41/0253; B04C 9/00; B28B 1/001; B28B 13/02; B28B 17/0081; B28B 18/00; B28B 17/0072; B28B 17/04; B08B 5/04; B08B 15/02; B29B 9/12; B29B 9/02; B32B 18/00; B65G 47/19; B65G 53/66; C04B 35/16; C04B 35/505; C04B 35/195; C04B 35/46; C04B 35/58014; C04B 35/62807; C04B 35/468; C04B 35/453; C04B 35/58071; C04B 35/497; C04B 35/50; C04B 35/48; C04B 35/495; C04B 35/584; C04B 35/26; C04B 35/563; C04B 35/20; C04B 35/5607; C04B 35/5611; C04B 35/10; C04B 35/447; C04B 35/01; C04B 35/12; C04B 35/457; C04B 35/58064; C04B 35/03; C04B 35/488; C04B 35/5805; C04B 35/472; C04B 35/58078; C04B 35/016; C04B 35/265; C04B 35/581; C04B 35/185; C04B 35/2658; C04B 35/481; C04B 35/49; C25D 7/04; C25D 15/00; G05D 7/0605; G01G 11/043

See application file for complete search history.

(56) References Cited

U.S. PATENT DOCUMENTS

| | | | | |
|---|---|---|---|---|
| 7,383,971 | B2 * | 6/2008 | Hanaoka | G01F 11/46 222/440 |
| 2005/0133527 | A1 * | 6/2005 | Dullea | B29C 45/7312 222/1 |
| 2009/0312954 | A1 * | 12/2009 | Utriainen | G01N 27/128 257/E29.1 |
| 2010/0145635 | A1 * | 6/2010 | Pauncz | G01F 1/28 702/45 |
| 2010/0304010 | A1 * | 12/2010 | Powell | G01F 1/64 427/8 |
| 2016/0185048 | A1 * | 6/2016 | Dave | B22F 10/20 700/119 |
| 2017/0304894 | A1 * | 10/2017 | Buller | B22F 12/45 |

* cited by examiner

POWDER MATERIAL MASS FLOW RATE MEASURING APPARATUS FOR ADDITIVE MANUFACTURING

CROSS-REFERENCE TO RELATED APPLICATION

This application claims the benefit of U.S. Provisional Application 62/592,053, filed Nov. 29, 2017, the disclosure of which is incorporated by reference in its entirety.

FIELD OF THE INVENTION

The present application relates to a powder mass flow rate apparatus for direct metal deposition processing of a three-dimensional workpiece.

BACKGROUND OF THE INVENTION

Various processes have been used to deposit material onto a workpiece to enhance dimensional and durability characteristics of the workpiece. One such process is known as direct metal deposition (DMD) where a laser energy beam focused upon the workpiece is infused with inert gas-blown powder metal alloy, causing the alloy to become molten and deposit upon the three-dimensional (3D) workpiece, while the inert gases provide inert shield around the molten pool. While this process has been proven technically feasible and commercially viable, its use is sometimes limited when manufacturing large objects due to the requirement of unattended operation of the process for several days continuously. The in-process measurement of metal powder material mass flow rate is one of the critical process monitoring requirements while building large 3D objects in unattended operational mode and for graded material manufacturing where multiple material powder are fed simultaneously at continuously varying mass proportion.

Detecting powder material flow along a powder material flow path has been attempted. U.S. Pat. No. 9,372,108, titled "Powder Flow Detection," discloses the use of a light source and a light detector for detecting light from the light source directed across the powder material flow path as powder material flows through the powder material flow path. This method is not in practice measuring an actual flow rate, but rather analyzing whether the flow rate has changed. This shortcoming is due to the inherent property of light-based sensing methods. The limitations also include small powder material particles in the powder material flow path influencing sensor measurement.

A considerable number of large metal 3D printed workpieces need a quality control measure to monitor actual metal powder material mass being delivered to the workpiece sections during lengthy processing runs. An accurate method of measuring and controlling of powder material mass flow rate is required for continuously varying the mass proportion of graded material manufacturing where multiple material powders are fed simultaneously into the process. Therefore, there is a need to develop an apparatus to reliably measure the metal powder material mass flow rate during DMD processing for 3D workpieces in the metal additive manufacturing field.

SUMMARY OF THE INVENTION

An apparatus for measuring the metal powder material mass flow rate during direct metal deposition is provided. The apparatus includes a detection strip in the metal powder material flow path. The detection strip is fixed at one end and suspended at the other end. Gas-blown metal powder causes a deflection of the free end of the detection strip. This deflection is measured by a sensor and converted into a mass flow rate for closed-loop control of powder flow during direct metal deposition. A related method of operation is also provided herein.

The apparatus includes a housing for enclosing the detection strip. The housing includes a metal powder inlet port and a metal powder outlet port and includes internal features for smooth travel of the metal powder. The housing can be positioned anywhere in the metal powder material flow path between a metal powder material delivery hopper and a direct metal deposition nozzle. The apparatus provides significant improvement to in-process measurement of the metal powder mass flow rate during the direct metal deposition process through physical contact with a stream of metal powder material.

The sensor is operable to measure the gas-blown metal powder mass flow rate, ranging between 2 grams/minute to 80 grams/minute or 0.033 grams/second to 1.33 grams/second with metal powder particle size ranging between 20 micro meters to 200 micro meters with metal powder particle shape ranging from spherical to irregular with metal powder density ranging from 2 g/cc to 25 g/cc such, including for example aluminum 2.7 g/cc, titanium 4.4 g/cc, stainless steel 7.8 g/cc, niobium 8.57 g/cc, molybdenum 10.28 g/cc, tungsten carbide 15.6 g/cc, tantalum 16.69 g/cc, tungsten 19.25 g/cc, and rhenium 21.02 g/cc. The sensor includes a measurement accuracy ranging from 2% to 5% of the actual metal powder material mass flow rate, which is dependent on metal powder material density, metal powder material particle shape, and metal powder material particle size.

The sensor can include one or more displacement sensors to measure the deflection of a portion of the free end of the detection strip. The one or more displacement sensors can be of any type of proximity sensor, which includes eddy current, inductive, capacitive or other. The detection strip or strips are positioned in the metal powder flow path and comprise any material subject to bending. The material, thickness and dimension of the detection strip(s) and the housing can be of any variation which will be based on the minimum and maximum mass flow rate measurement requirements and the type of metal powder material being used. The enclosed housing can be oriented vertically and can be oriented in other variations and the housing can be of various shapes and sizes.

The related method of operation includes positioning the detection strip in the metal powder material flow path, such that the metal powder causes a continuous deflection of the free end of the detection strip. The method of operation further includes measuring, using the sensor, the deflection of the detection strip, determining the mass flow rate based on the output of the sensor, and melting the metal powder at the surface of the workpiece such that, once cooled, the metal powder solidifies as an added layer of the workpiece.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
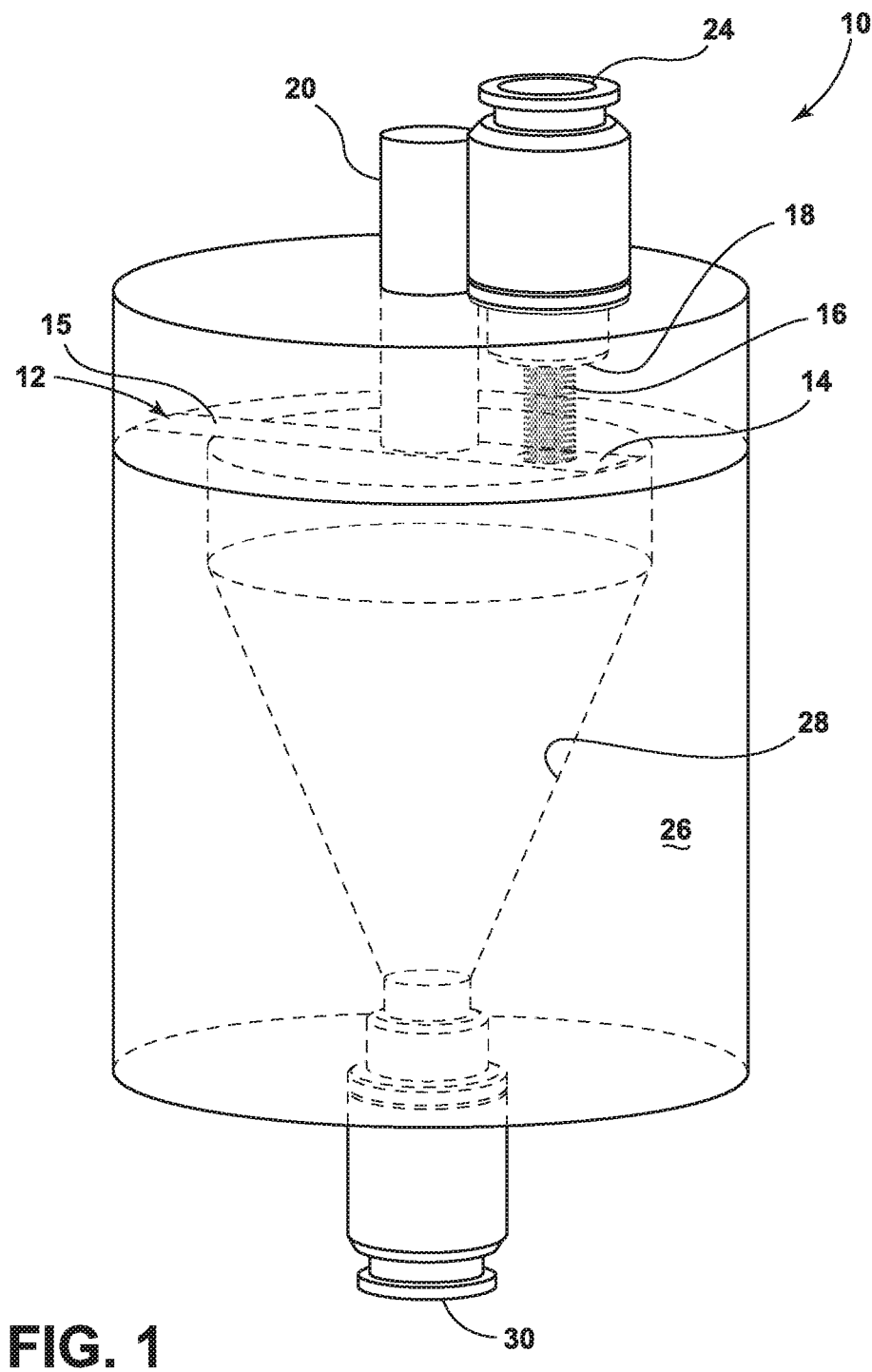
FIG. 1 shows a perspective view of a basic configuration of the apparatus.

Referring to FIG. 1, a metal powder mass flow rate measurement apparatus in accordance with one embodiment is illustrated and generally designated 10. The apparatus 10 includes a detection strip 12 that receives metal powder on or near its free end 14. In particular, gas-blown metal powder 16 exits through a first opening 18 above the detection strip 12 and imparts a continuous load on or near the free end 14 of the detection strip 12. The load is orthogonal to the lengthwise axis of the deflection strip 12 in the current embodiment, such that the deflection strip 12 is functionally a cantilevered end-loaded (or nearly end-loaded) beam. As discussed below, the load causes a deflection of the free end 14 of the detection strip 12, the deflection being a function of the amount of the load. The deflection is also a function the location of the load, the length of the detection strip 12 (defined between the free end 14 and the fixed end 15), its modulus of elasticity, and its area moment of inertia, which are generally fixed.

In the current embodiment, the detection strip 12 is formed from a non-magnetic alloy or non-magnetic material that will not attract powder material 16 having magnetic properties, such as, for example, AISI 4000 series steels, tool steels, etc. In other embodiments, the detection strip 12 is formed from a magnetic alloy or magnetic material that will not attract powder material 16 having no magnetic properties. The thickness of the detection strip 12 can include a range between about 0.001 inches and 0.020 inches inclusive, while also having a constant cross-section and a modulus of elasticity of between 190 and 210 GPa inclusive.

The detection strip 12 flexes a greater distance from its initial position in response to impacts from powder material with a higher mass flow rate. The detection strip 12 flexes a lesser distance from its initial position in response to impacts from powder material with a lower mass flow rate. In the current embodiment, a sensor 20 detects a deflection of the detection strip 12 at one or more points along its length and provides an output in the form of an analog electrical signal. The electrical signal is converted into a digital signal and is measured by a controller 22 (shown in FIG. 5) over time. The controller 22 converts the output of the displacement measurement sensor 20 into a powder mass flow rate.

In the current embodiment, the sensor 20 includes a displacement measurement sensor 20 to measure the distance to the upper surface of the detection strip 12. In other embodiments, the sensor 20 can include both non-contact sensors and contact sensors, provided that the amount of deflection of detection strip 12 is directly or indirectly measured. Non-contact sensors include an inductive sensor, and eddy current sensor, a capacitive sensor, a photoelectric sensor, an ultrasonic sensor. Contact sensors are mounted to the detection strip 12 and include strain gauge sensors and limit switch sensors, which detects when the detection strip is in contact with the a limit switch actuator.

Referring again to FIG. 1, a powder material stream is fed through a powder material inlet port 24, which is mounted on a housing 26. The powder feed includes metallic powder, composite powder, ceramic powder, and combination thereof. The displacement measurement sensor 20 is mounted to the same housing 26 adjacent to the metal powder material inlet port 24. The housing 26 includes a conical interior surface 28 for smooth travel of metal powder material particles. This internal feature 28 takes the form of a tapered conical hopper having a narrow end at the bottom of the housing 26 leading to a powder material outlet port 30.

Figure 2:
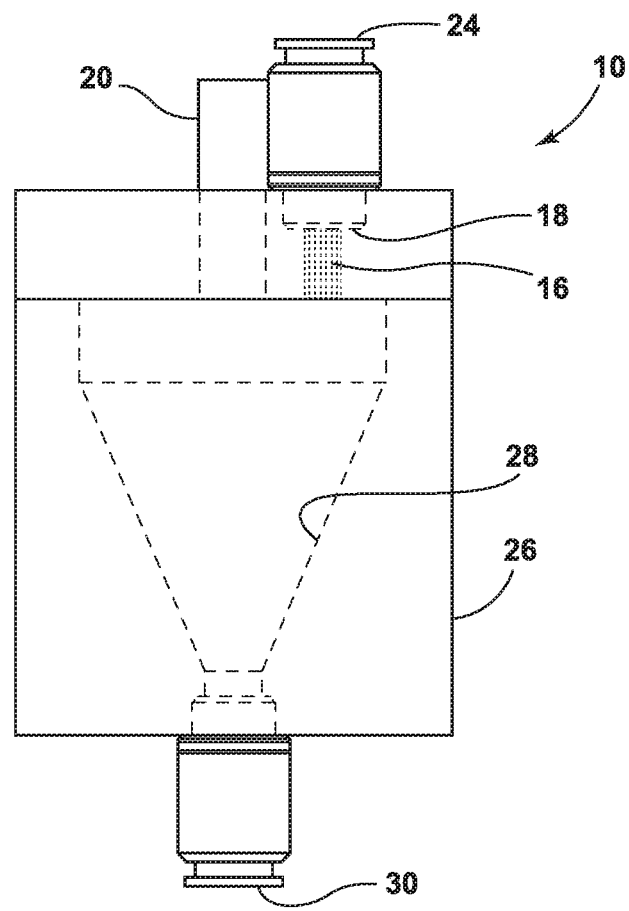
FIG. 2 shows a side view schematic of the apparatus.
Figure 3:
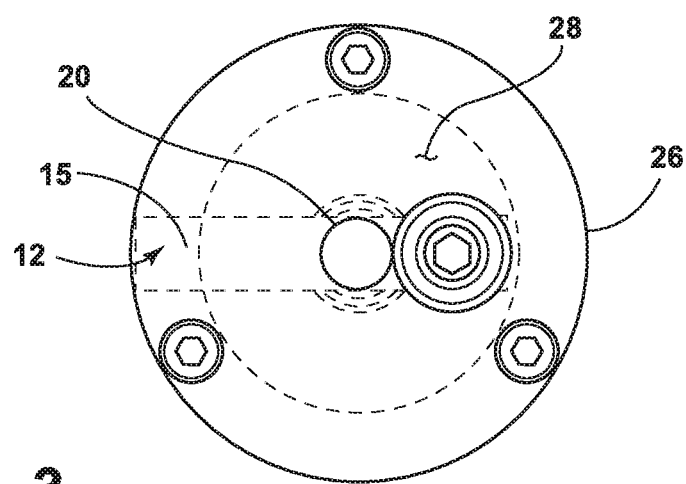
FIG. 3 shows a bottom view schematic of the apparatus.

As also shown in FIG. 1, the detection strip 12 is located below the displacement measurement sensor 20. The detection strip 12 is fixed at a first end 15, which is farthest from the metal powder material stream 16. The detection strip extends through the powder stream 16 to a second end 14 that is free-floating. Therefore, the powder stream 16 can cause the detection strip 12 to flex, displacing the second end 14 downwardly from its original position, the original position being shown in FIG. 1. The measurement sensor 20 is disposed in an axial location directly above the powder material outlet 30, and the controller 22 measures the change in distance between the detection strip 12 and the measurement sensor 20 caused by the powder stream 16. Therefore, as seen in FIG. 2, the powder material inlet 24 is offset from the powder material outlet 30. The conical shape of the hopper 28 maintains fluidization of the powder material and directs the powder material into the powder material outlet 30. The gas-blown metal powder material, after impinging the detection strip 12, falls to the hopper 28 and exits through the powder material outlet 30.

Figure 4:
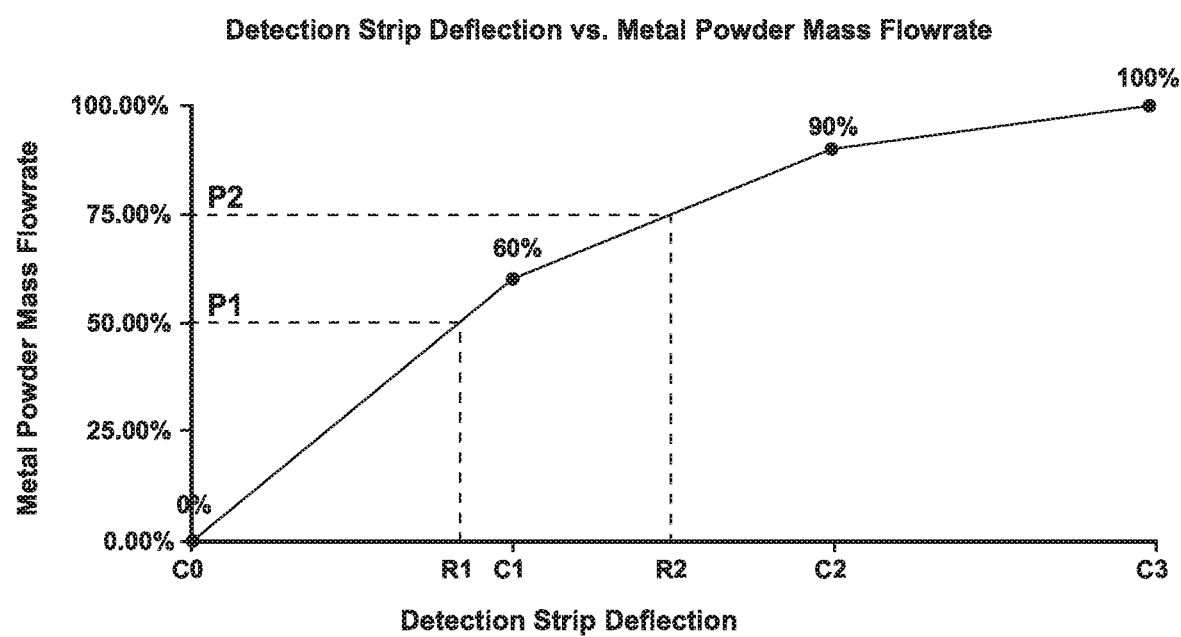
FIG. 4 shows the example chart of displacement sensor output vs metal powder material mass flow rate.

FIG. 4 includes a chart that represents a correlation between the deflection of the detection strip 12 and the measured powder material mass flow rate as a percentage of the maximum mass flow rate. Points C0, C1, C2, C3 are pre-calibrated with corresponding mass flow rates using a weighing machine or any type of off-line metal powder material mass flow rate measurement device. A calibration chart is created using these points. Point C0 represents the deflection of the detection strip when an inert gas carries no metal powder material. Point C1 represents the deflection of the detection strip when the inert gas carries 60% of maximum metal powder material feed rate. Point C2 represents the deflection of the detection strip when inert gas carries 90% of maximum metal powder material feed rate. Point C3 represents the deflection of the detection strip when inert gas carries 100% of maximum metal powder material feed rate.

During the DMD process, when R1 is the deflection of the detection strip at a given location along its length, P1 is the metal powder material mass flow rate as derived from the calibration chart. When R2 is the deflection of the detection strip at the same location, R2 being greater than R1, P2 is the metal powder material mass flow rate as derived from the calibration chart. The correlation between material mass and detection strip displacement is programmed by way of a look up table or formula in the controller 22. Therefore, the controller 22 identifies mass flow rate of the powder material by way of the amount of flexure of the detection strip 12 for closed-loop control of the powder mass flow rate. In this manner, the growth characteristic of a melt pool on the workpiece is accurately controlled.

Figure 5:
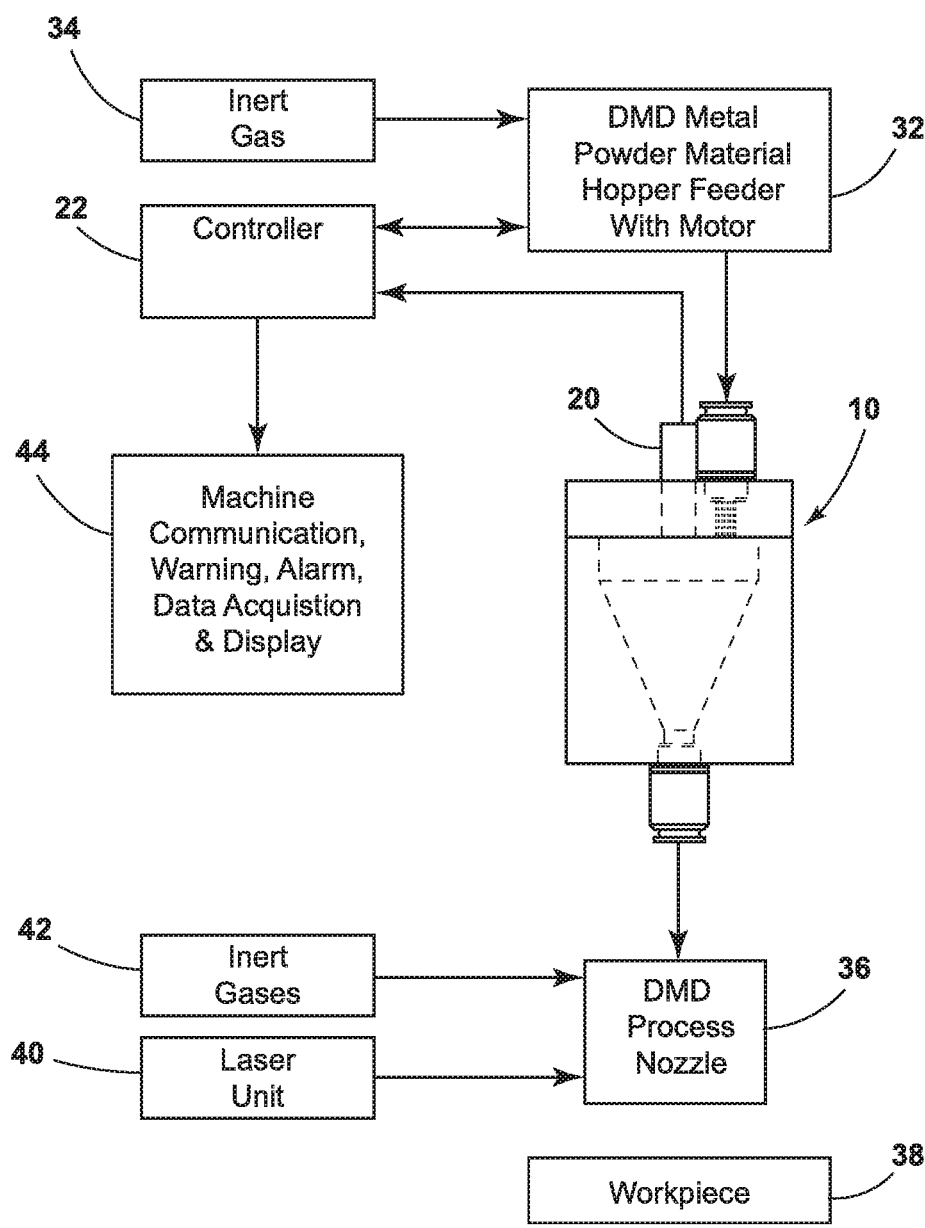
FIG. 5 shows the schematics of DMD process with metal powder material mass flow rate measurement apparatus.

FIG. 5 shows a schematic diagram of the DMD process with the metal powder material mass flow rate measurement apparatus 10. A motor-driven hopper 32 delivers a metered supply of metal powder material along with inert gas 34 into the metal powder material flow path. The metal powder material along with the inert gas are fed into the DMD process nozzle 36. The nozzle 36 deposits the metal powder onto a surface of the workpiece 38 along with laser energy 40 and additional inert shielding gases 42, during which a melt pool forms on the workpiece. Once cooled, the melt pool forms a further layer of the workpiece in accordance with additive manufacturing techniques.

The displacement measurement sensor 20 outputs an electrical signal to the controller 22. The controller 22 stores the calibration chart, look-up table, or formula to non-transitive memory. During the DMD process run, the displacement position value from displacement measurement sensor 20 (representing a measure of the deflection of the detection strip 12) is stored to memory, optionally as part of a shift register, with a new value being added every several microseconds. The calibration chart, look-up table, or formula is used by the controller 22 to determine the actual metal powder material mass flow rate (plus or minus 5%). Based on the actual metal powder material mass flow rate, the controller 22 communicates this information to the machine, operator, data acquisition system, and display system 44. The controller 22 outputs correction signals to the motor-driven hopper 32 according to a closed-feedback loop, in which the reference signal is the desired mass flow rate and the error signal is the difference between the desired mass flow rate and the measured mass flow rate. This feedback from the controller 22 causes the hopper 32 to make corrections, either by controlling motor speed or by controlling a valve opening, to maintain the mass flow rate of metal powder material within a predetermined acceptable range.

The disclosed sensor 20 is operable to measure the gas-blown metal powder material mass flow rate ranging between 2 grams/minute to 80 grams/minute or 0.033 grams/second to 1.33 grams/second. The metal powder material particle size ranges from 20 micrometers to 200 micrometers with a metal powder material particle shape ranging from spherical, oval, and irregular morphologies. The metal powder material density ranges from 2 g/cc to 25 g/cc, such as aluminum 2.7 g/cc, titanium 4.4 g/cc, stainless steel 7.8 g/cc, niobium 8.57 g/cc, molybdenum 10.28 g/cc, tungsten carbide 15.6 g/cc, tantalum 16.69 g/cc, tungsten 19.25 g/cc, and rhenium 21.02 g/cc. The use of "metal" within the specification of the present application is intended to be exemplary and not limiting. Alternative materials are also within the scope of this invention including ceramics and non-metallic elements.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An apparatus to measure a mass flow rate of gas-blown metal powders, the apparatus comprising:
   a housing including a powder inlet and a powder outlet, wherein the powder inlet is disposed above the powder outlet such that the housing defines a vertical flow path between the powder inlet and the powder outlet, wherein the gas-blown metal powders flow vertically through the powder inlet and through the powder outlet, the powder inlet being laterally offset from the powder outlet, the housing further including a conical interior surface to guide the gas-blown metal powders from the powder inlet toward the laterally offset powder outlet;
   a horizontal detection strip enclosed within the housing, the horizontal detection strip having a first end disposed in a fixed position and a second end disposed in a free-floating position, the second end of the detection strip being positioned in the vertical flow path to intercept the gas-blown metal powders entering the housing through the powder inlet, wherein the gas-blown metal powders cause the detection strip to flex downward by displacing the second end of the detection strip;
   a displacement sensor positioned atop the housing and laterally offset from the powder inlet, the displacement sensor being adapted to measure an amount of vertical displacement of the detection strip at a location along a lengthwise axis of the detection strip between the first end of the detection strip and the second end of the detection strip, the displacement sensor providing an output; and
   a controller electrically coupled to the output of the displacement sensor, the controller being configured to:
      determine a mass flow rate of the gas-blown metal powders based on the output of the displacement sensor, the gas-blown metal powders having a diameter of between 20 microns and 200 microns and a density of between 2 $g/cm^3$ to 25 $g/cm^3$; and
      control the mass flow rate of the gas-blown metal powders in accordance with a feedback loop for direct metal deposition onto a workpiece.

2. The apparatus of claim 1 wherein the displacement sensor being is fixed relative to the housing.

3. The apparatus of claim 1 wherein the detection strip defines a length that is greater than ten times its width and defines a constant cross-sectional area.

4. The apparatus of claim 1 wherein the controller is operable to maintain the mass flow rate of the gas-blown metal powder within a predetermined acceptable range.

5. A method of direct metal deposition comprising:
   providing a continuous vertical flow of gas-blown metal powders through a housing having a powder inlet, an internal cavity, and a powder outlet for direct metal deposition onto a surface of a workpiece, wherein the powder inlet is disposed above the powder outlet such that the housing defines a vertical flow path between the powder inlet and the powder outlet, wherein the gas-blown metal powders flow vertically through each of the powder inlet and the powder outlet, the powder inlet being laterally offset from the powder outlet, the cavity including a conical interior surface to guide the gas-blown metal powders from the powder inlet toward the powder outlet;
   positioning a horizontal detection strip within the housing, the horizontal detection strip having a first end disposed in a fixed position and a second end disposed in a free-floating position, the second end of the detection strip being positioned in the vertical flow path to intercept the gas-blown metal powders entering the housing through the powder inlet, wherein the gas-blown metal powders cause a downward deflection of the detection strip, the gas-blown metal powders having a diameter of between 20 microns and 200 microns and a density of between 2 $g/cm^3$ to 25 $g/cm^3$;

measuring, using a sensor positioned atop the housing and laterally offset fro the powder inlet, the deflection of the detection strip at a location along a lengthwise axis of the detection strip between the first end of the detection strip and the second end of the detection strip, the sensor providing an output;

determining, using a controller, a mass flow rate of the continuous flow of the gas-blown metal powders based on the sensor output;

controlling an amount of the gas-blown metal powders that continue to flow to the workpiece based on the determined mass flow rate; and melting the metal powders at the surface of the workpiece with a laser beam such that, once cooled, the metal powders solidify as an added layer of the workpiece.

6. The method according to claim 5, wherein measuring the deflection of the detection strip is performed by a non-contact sensor.

7. The method according to claim 5, wherein measuring the deflection of the detection strip is performed by a contact sensor.

8. The method according to claim 5, wherein the detection strip defines a length that is greater than ten times its width.

9. The method according to claim 5, wherein the controller determines the mass flow rate based on a calibration chart stored to computer readable memory.

10. The method according to claim 5, wherein the controller determines the mass flow rate based on a look-up table stored to computer readable memory.

11. The method according to claim 5, wherein the controller determines the mass flow rate based on a formula stored to computer readable memory.

* * * * *